(12) United States Patent
Klenke et al.

(10) Patent No.: US 8,246,896 B2
(45) Date of Patent: Aug. 21, 2012

(54) IMPRESSION COMPOSITION FOR THE PREPARATION OF PRECISION OPTICS

(75) Inventors: Martin Klenke, Blieskastel (DE); Thomas Benthien, Saarbrücken (DE)

(73) Assignee: Nanogate Advance Materials GmbH (DE)

( * ) Notice: Subject to any disclaimer, the term of this patent is extended or adjusted under 35 U.S.C. 154(b) by 951 days.

(21) Appl. No.: 11/885,901

(22) PCT Filed: Mar. 8, 2006

(86) PCT No.: PCT/EP2006/060563
§ 371 (c)(1),
(2), (4) Date: Jan. 3, 2008

(87) PCT Pub. No.: WO2006/094997
PCT Pub. Date: Sep. 14, 2006

(65) Prior Publication Data
US 2008/0176064 A1    Jul. 24, 2008

(30) Foreign Application Priority Data
Mar. 10, 2005 (EP) .................................... 05101887

(51) Int. Cl.
C08F 2/46       (2006.01)
C08F 220/18   (2006.01)
C08F 220/22   (2006.01)
B32B 5/00       (2006.01)
B32B 27/00     (2006.01)
B29C 35/08     (2006.01)

(52) U.S. Cl. ....... 264/496; 264/1.1; 264/1.31; 264/1.36; 264/1.37; 264/1.38; 428/422; 522/182

(58) Field of Classification Search .................. 264/496, 264/1.1, 1.31, 1.36–1.38; 522/182, 183; 428/195, 332, 422; 156/245
See application file for complete search history.

(56) References Cited

U.S. PATENT DOCUMENTS

| 4,511,209 A | 4/1985 | Skutnik |
| 5,343,544 A | 8/1994 | Boyd et al. |
| 7,623,197 B2 * | 11/2009 | Klenke .......................... 349/61 |

FOREIGN PATENT DOCUMENTS

| EP | 0196212 A2 | 3/1986 |
| EP | 0333464 A1 | 3/1989 |
| EP | 0478261 A2 | 11/1991 |
| EP | 0536743 A1 | 8/1992 |
| EP | 1635201 A | 3/2006 |
| WO | WO 92/21492 A1 | 12/1992 |

* cited by examiner

*Primary Examiner* — Susan W Berman
(74) *Attorney, Agent, or Firm* — Clements Bernard PLLC; Gregory N. Clements

(57) ABSTRACT

The invention relates to a molding composition which is embodied as a molding composition, a thus produced molded body as a molded body, and a method for producing said molded body comprising a surface structure.

9 Claims, No Drawings

IMPRESSION COMPOSITION FOR THE PREPARATION OF PRECISION OPTICS

FIELD OF THE INVENTION

The invention relates to an impression composition for precision optics, a molded part prepared therefrom and a process for producing such molded part with a surface structure.

BACKGROUND

Known illumination means for displays, for example, of mobile applications, have a light source which is a tubular light source (CCFL; cold cathode fluorescent lamp), for example. The light emitted by the light source is coupled into a molded part with a wedge-shaped cross-section or cuboid shape on a front surface thereof. Especially due to the wedge-shaped embodiment of the molded part, a total reflection of the light beams at the phase boundary and, through corresponding scattering centers, an exiting of the light beams at the surface of the wedge-shaped molded part occur. The surface of the wedge-shaped molded part is arranged opposite to the display to be transilluminated. The surface of the molded part has such a structure that the light exits from the optical waveguide by refraction. The thus refracted light is collimated by several films provided between the molded part and the display and guided in such a way that an essentially white light arrives at the display. The structure of such illumination means is complicated, all the more so since several films must be inserted in one frame or the like, for example, and it must be ensured that shifting or the like of the films is avoided. Due to the complicated structure, the manufacturing cost is high. Further, there is a risk of functional defects.

Compositions containing various acrylates are known.

EP 0 478 261 A2 describes defined compositions containing up to 45% by weight of a partially fluorinated acrylate.

U.S. Pat. No. 4,511,209 A describes compositions containing either more than 9% by weight of photoinitiator or less than 50% by weight of partially fluorinated acrylate.

WO 92/21492 A1 describes compositions containing more than 5% by weight of photoinitiator.

EP 0 536 743 A1 describes compositions containing less than 50% by weight of partially fluorinated acrylate or less than 24.9% by weight of non-fluorinated acrylate.

EP 0 333 464 A1 describes compositions that contain spacer-free perfluorinated acrylates.

EP 0 196 212 A2 also describes compositions with spacer-free perfluorinated acrylates.

SUMMARY OF THE INVENTION

It is the object of the invention to provide an impression composition and a process for producing a surface structure of a molded part that enables the reliable and inexpensive preparation without additional necessary films.

In a first embodiment, the object of the invention is achieved by a solvent-free impression composition, containing:
a) from 50 to 65% by weight of at least one 1H,1H,2H,2H-perfluoroalkyl acrylate having a chain length of the alkyl residue of from 6 to 12 carbon atoms;
b) from 24.9 to 45% by weight of at least one non-fluorinated acrylate; and
c) from 0.1 to 5% by weight of at least one photoinitiator.

DESCRIPTION OF THE EMBODIMENTS

According to the invention, when a surface structure of a molded part is produced, the impression composition is applied to a negative casting mold and/or a molded part. Preferably, the negative casting mold has, as a negative form, the surface structure to be transferred to the molded part as a substrate. The transfer of the surface structure is effected by means of the curable impression composition which becomes bonded to the surface of the molded part after curing. The molded part is a substrate preferably prepared from a transparent material, especially transparent plastic material. The transparent plastic materials preferably comprise those selected from the group of methacrylate polymers (for example, PMMA-polymethylmethacrylate), polycarbonates, cyclic olefin polymers, styrene polymers, polyacrylates, polyethersulfones and/or polyimides. The molded part may also consist of glass.

Perfluorinated acrylates within the meaning of the present invention preferably comprise linear, branched and/or cyclic alkyl acrylates or mixtures of such acrylates in which, in particular, the two carbon atoms adjacent to the acrylate function (spacers) are not fluorinated, and in which the residues of the alkyl chains preferably have between 6 and 12 carbon atoms. The perfluorinated acrylate is a perfluoroalkylethyl acrylate (for example, Fluowet® AC 600 from Clariant), wherein the ethyl group is not fluorinated and the perfluorinated alkyl residue has from 4 to 10 carbon atoms. If the alkyl chains are longer, the demoldability may no longer be ensured, or two phases of the perfluorinated and non-fluorinated acrylate monomers may form. If two or more phases are formed in the composition of the monomers, this may lead to more light scattering (haze) in the cured layer. However, if the alkyl chains are shorter, the resulting impression composition may be too low-viscous.

Therefore, the molecular weight of the perfluorinated acrylate monomers is preferably within a range of from 350 to 500 g/mol. If the molecular weight is above this range, the resulting impression composition may easily obtain too high a viscosity, which may result in an increased formation of defects and artifacts of the surface elements. If the molecular weight is below this range, the resulting impression composition may easily obtain too low a viscosity, which may result in too low a layer thickness of the layer as a portion of the molded part according to the Invention.

Advantageously, the melting point of the perfluorinated acrylate monomers according to the invention is within a range of from 15 to 40° C. Since the impression composition is preferably employed at room temperature, the viscosity of the impression composition can be additionally controlled by selecting the melting point of the perfluorinated acrylate monomers within the preferred range near room temperature.

Non-fluorinated acrylates according to the invention are preferably linear, branched and/or cyclic alkyl acrylates or mixtures of such acrylates. Particularly preferred are monomers having two or more acrylate functions and/or two or more alcohol groups and/or at least one ether bridge (for example, dipropyleneglycol diacrylate, diethyleneglycol diacrylate, 1,6-hexanediol diacrylate, tetraethyleneglycol diacrylate, triethyleneglycol diacrylate, tripropyleneglycol diacrylate, alkoxylated hexanediol diacrylate, or esterdiol diacrylate or mixtures of such monomers), because these monomers, due to their multiple functionality, result in particularly stable and optically flawless layers as a portion of the molded part according to the invention. Advantageously, the alkyl chains have from 6 to 12 carbon atoms. If the alkyl chains are longer, two phases of the partially fluorinated and non-fluorinated acrylate monomers are easily formed. However, if the alkyl chains are shorter, the resulting impression composition may be too low-viscous.

The molecular weight of the non-fluorinated acrylate monomers according to the invention is preferably within a range of from 150 to 340 g/mol. If the molecular weight of the perfluorinated acrylate monomers is above this range, the resulting impression composition may easily obtain too high a viscosity, which may result in an increased formation of defects and artifacts of the surface elements. If the molecular weight is below this range, the resulting impression composition may easily obtain too low a viscosity, which may result in too low a layer thickness of the layer as a portion of the molded part according to the invention.

Photoinitiators within the meaning of the invention are preferably phenylketone derivatives (for example, Irgacure® 184 and/or Irgacure® 819 from Ciba Spezialitätenchemie Lampersheim GmbH), because these have a particularly low negative impact on the optical properties of the resulting molded part according to the invention.

Preferably, the impression composition contains from 55 to 60% by weight of a perfluorinated acrylate or a mixture of different perfluorinated acrylates, because when the content of the perfluorinated acrylate is too high or too low, phase separations of the partially fluorinated and non-fluorinated acrylate monomers may easily form.

The impression composition advantageously contains from 34.9 to 45% by weight of a non-fluorinated acrylate or a mixture of different non-fluorinated acrylates. For a lower content of non-fluorinated acrylates, an increased formation of two-phase impression composition systems was observed. The formation of phase separations in the composition of the monomers results in more light scattering (haze) in the cured layer. When the proportion of non-fluorinated acrylates is higher, an enhanced adhesion of the cured impression composition to the negative casting mold occurred and thus problems during the demolding occurred.

Advantageously, the impression composition contains from 1 to 2% by weight of a photoinitiator or mixture of different photoinitiators. This causes a particularly high cross-linking of the monomers and thus an improved optical quality and mechanical loadability.

Preferably, the impression composition has a viscosity of from 2 to 30 mPa·s (cP) at room temperature. The surface structure of the negative casting mold or the molded part can be reproduced particularly exactly thereby. The viscosity can be measured at 25° C. with a Brookfield viscometer at a revolution per minute of 900 and a CAP-1 spindle and a sample volume of 67 µl.

Preferably, the impression composition is one-phase and/or homogeneous and advantageously has a density within a range of from 1 to 1.5 g/ml. Thus, the impression composition has a higher density than that of usual organic compositions and liquids and can displace any organic liquids present from the negative casting mold. Thus, defects of the cured layer with the surface elements can be avoided in turn.

Preferably, the impression composition is free from solvents, because this not only results in a more environment-friendly preparation process, but in addition, the solvent which may escape upon curing can lead to defects in the surface structure of the molded part according to the invention.

In a second embodiment, the object of the invention is achieved by a transparent molded part comprising a sheet-like substrate and, on a major surface of the substrate, a layer having a layer thickness within a range of from 3 to 300 µm and consisting of a polymerized impression composition, containing:
a) from 50 to 65% by weight of at least one perfluorinated acrylate as defined above;
b) from 24.9 to 45% by weight of at least one non-fluorinated acrylate; and
c) from 0.1 to 5% by weight of at least one photoinitiator;
wherein the layer has a surface structure with diffractive surface elements having a maximum structure size of defects of such surface elements of up to 100 nm, especially of up to 50 nm on the surface facing away from the substrate.

Defects within the meaning of the invention are all those structures on the surface of the layer of the molded part according to the invention that are unintentional. These include, for example, disruptions, molding defects and similar defects. For example, if the diffractive surface elements of the molded part according to the invention have a size of from 0.04 to 10,000 µm$^2$ and a mutual distance of from 1 to 100 µm, according to the invention, these surface elements preferably have no additional structures at their exterior surfaces that are unintentional and have a structure size of more than 100 nm. The maximum volume of such defects is preferably 1,000,000 nm$^3$, especially 125,000 nm$^3$.

Advantageously, the layer thickness of the layer according to the invention on the substrate, which together form the molded part according to the invention, is from 5 to 50 µm, especially from 10 to 30 µm. If the layer thickness is below 5 µm, the freedom of design with respect to the diffractive surface elements may be too much restricted. However, if the layer thickness is above 50 µm, there may be undesirable losses with respect to the optical quality of the molded part according to the invention.

The substrate preferably consists of glass, a methacrylate polymer (for example, PMMA), polycarbonate, a cyclic olefin polymer, styrene polymer, polyacrylate, polyethersulfone and/or polyimide, especially PMMA. These materials combine particularly good optical properties with a high compatibility with the impression composition according to the invention.

The molded part is said to be "transparent" within the meaning of the invention, if the maximum light scattering (haze) of the layer, measured according to ASTM D 1003-00 (year 2000), without taking the diffractive surface elements into account is up to 10%, preferably up to 5%, for a layer thickness of 10 mm. Thus, a particularly high light yield for the intended emission direction can be obtained, and there is less scattering loss into the unintentional emission directions.

The color of the molded part according to the invention is preferably in a color space as defined according to the CIE Lab system within a range of a <0.5 and/or b<0.5, and/or L>80%. Thus, a particularly color-neutral molded part can be obtained that may be employed, for example, as a backlight in mobile phones.

This color space essentially corresponds to a range of $0.0 \leq x \leq 0.4$ and $0.3 \leq y \leq 0.4$ in the CIE 1931 color model.

In a third embodiment, the object of the invention is achieved by an essentially pressureless process for the preparation of a molded part according to the invention, comprising the following steps:
a) providing a negative casting mold with shapings of surface elements;
b) introducing the impression composition, containing
   i) from 50 to 65% by weight of at least one perfluorinated acrylate as defined above;
   ii) from 24.9 to 45% by weight of at least one non-fluorinated acrylate; and
   iii) from 0.1 to 5% by weight of at least one photoinitiator; into the casting mold in an amount exceeding the shapings in the surface elements;
c) applying a substrate to the exposed surface of the impression composition;

d) polymerizing the impression composition to bond the layer of the impression composition to the substrate for preparing the molded part; and e) removing the finished molded part from the negative casting mold.

In this process, the substrate does not contact the surface of the negative mold, but practically floats on an exposed surface of the impression composition.

After the sandwich-like superposition of the substrate and the negative casting mold with the impression composition as an intermediate layer, the impression composition is cured. This is effected, for example, with the action of temperature and/or radiation, the use of UV radiation being particularly preferred, because the impression composition can be cured particularly quickly in this way. For the impression composition, a curing time of less than 3 seconds, especially of about 1 second, is sufficient because the process duration and thus the cost for the preparation process can be reduced thereby. Subsequently, the molded part and the negative casting mold are separated. Since the negative casting mold preferably has a surface that does not bond to the impression composition, or the adhesive force between the surface of the negative casting mold and the impression composition is lower than the adhesive force between the impression composition and the molded part, it is preferably possible to work without a solvent for separating the molded part from the negative casting mold. This has the advantage that the very fine surface structures of the negative casting mold are not varnished over by solvents or the like to adversely affect the exactness of the deformation of the surface structure.

"Pressureless" within the meaning of the invention means that no pressure is applied to the impression composition in steps c) and d) beyond the pressure caused by the atmospheric pressure, gravity, the overlaying substrate and the slight pressing of the substrate onto the negative casting mold. This slight pressing is to be understood as a pressure that is necessary to impress a foam having an impression hardness of from 50 to 200 N according to DIN 53576-B by 3 mm.

Due to the very fine surface structure of the negative casting mold, it is of particular importance according to the invention that the layer of the impression composition between the negative casting mold and the substrate is very uniform and especially does not have any impurities, such as air inclusions and the like. In order to achieve this, the substrate or the negative casting mold is first pressed on one side thereof. This has the result that the negative casting mold and the substrate have an extending cleft at the beginning of the pressing process starting from this first side. Subsequently, the pressing area is now increased towards the second side starting from the first side. Thus, the cleft is closed, whereby any existing air bubbles are pushed out of the cleft. Due to the capillary forces occurring in the cleft, a uniform distribution of the impression composition throughout the desired surface, especially throughout the side of the substrate adjacent to the negative casting mold, is ensured.

The negative casting mold is preferably a so-called shim. This refers to a negative casting mold which is particularly suitable for fine molding processes in the field of optics. In order to be able to avoid the use of release agents, the shim preferably has a nickel surface or consists completely of nickel. This ensures a particularly easy demolding operation. The nickel platelet preferably has a very thin design and has a thickness of about 0.1 to 1 mm, for example. Thus, the platelet can be elastically deformed with a particularly low force to accomplish the deforming. For producing the very small surface structure in the nickel layer, the nickel shim is preferably molded galvanically. The surface structure is preferably introduced into the nickel shim by lithographic processes. Thus, when the negative casting mold is prepared, established processes can be recurred to. Preferably, the nickel shim is connected, especially bonded, to a stiffening body, such as a glass-fiber plate, for stiffening in order that the deformation is actually elastic upon demolding and the platelet as such is not permanently deformed with time.

Preferably, for uniformly applying or distributing the impression composition as an impression composition between the molded part and the negative casting mold, the pressing area is continuously increased. In particular, it is ensured that pressed areas are not separated any more, to avoid the production of inclusions. Preferably, the molded part forms an opening angle with the negative casting mold during the pressing process that is preferably <3° and more preferably <2°, whereby as uniform as possible a distribution of the impression composition can be achieved. The application of the impression composition onto the negative casting mold and/or the molded part is preferably effected by dripping on, because this enables at the same time a good dosage and a particularly good spreading of the impression composition on the negative casting mold. Preferably, an exact impression composition volume is applied by means of a dispensing means in order that the reproducibility of the molded part according to the invention can be achieved more readily. For a surface of 0.0016 m$^2$, preferably, an impression composition volume of 80 µl±2 µl is applied because the negative casting mold is filled with impression composition particularly exactly thereby for the dimensions described. Thus, for the above mentioned reasons, an impression composition volume of preferably 50 ml is applied per m$^2$. In order to ensure that the surface of the molded part to be provided with a structure is wetted with impression composition throughout, the supplying of the impression composition is preferably effected with an adequate excess amount.

In order to ensure a secure bonding of the impression composition with the molded part, the surface of the substrate to be contacted with the impression composition is preferably pretreated to achieve a particularly good adhesion of the layer of cured impression composition to the substrate. It is particularly preferred to effect a pretreatment with UV radiation because freeradical reaction centers may form thereby on the surface of the substrate, and the cross-linking of the impression composition may begin at the surface of the substrate already when the impression composition is applied. When PMMA is used as the substrate and the above described impression composition is employed, a pretreatment of a few seconds, especially less than 2 seconds, is sufficient. It is particularly preferred, when the curing is promoted by UV radiation, to provide a common device for pretreatment and curing. Thus, it is possible to pretreat a substrate that is still to be coated, while another substrate already provided with impression composition is subjected to the curing of the impression composition.

It is particularly preferred to provide an inert gas atmosphere, especially an atmosphere of argon, nitrogen and/or carbon dioxide, while the impression composition is applied and/or the substrate is pressed on and/or the impression composition is cured, because the curing can be surveyed better thereby as freely as possible from external influences, such as the ozone content (source of free radicals) of the ambient air. This especially avoids the premature formation by air of free radicals or other factors that may adversely affect the impression composition.

The separation of the molded part from the negative casting mold is preferably effected by elastically deforming the molded part and/or the negative casting mold, because the negative casting mold can be reused in this way. Preferably, only the negative casting mold is elastically deformed in order to avoid damage to the surface structure applied to the molded part. Since the negative casting mold preferably has a nickel surface according to the invention and the cured impression composition adheres better to the surface of the substrate than to the nickel surface, the provision of release agents is not necessary. Thus, preferably, no release agent is employed in the process according to the invention. Further, in this preferred embodiment of the process, it is not required to clean the negative casting mold because no residues of cured impression composition remain on the negative casting mold. Thus, the negative casting mold has a self-cleaning function.

Advantageously, the process is performed at room temperature (25° C.). This results in a substantial simplification of process management as compared to conventional processes.

The amount of impression composition introduced into the negative casting mold in step b) is advantageously within a range of from 60 to 100 μl. It is particularly preferred if the impression composition is introduced in exactly that amount that causes a meniscus of impression composition to form throughout the border region of the substrate. This has the advantage that not more than the necessary amount of impression composition is employed, and on the other hand, the layer of the impression composition between the substrate and the negative casting mold is a closed layer.

The process according to the invention is preferably performed in an environment protected from dust in order that an unobjectionable optical quality of the molded parts with the coating according to the invention can be achieved.

Further, it is advantageous if the impression composition is distributed on the negative casting mold only by applying the substrate. The formation of air bubbles and thus a defective formation of the cured layer can be avoided thereby.

EXAMPLE 11 g of 1H,1H,2H,2H-perfluorooctyl acrylate was mixed with 8 g of dipropyleneglycol diacrylate, 0.1 g of Irgacure® 819 and 0.2 g of Irgacure® 184 from Ciba Spezialitatenchemie Lampersheim GmbH. 60 μl of the resulting mixture was applied to a 2×2 cm sized nickel plate on whose surface a negative shape of a molded part with scattering centers has been formed. Subsequently, a 1 mm thick and 1×1 cm sized platelet of PMMA was applied to the surface of the mixture on the nickel plate. Thereupon, the thus obtained sandwich of the nickel plate with the mixture between was subjected to UV radiation with a commercially available UV mercury lamp for 2 seconds. Subsequently, the substrate with the cured impression composition bonded thereto was removed from the negative casting mold. The preparation process is essentially similar to the preparation process for optical waveguide elements described in the European Patent Application 05 003 358.8, which is included herein by reference.

The invention claimed is:

1. Solvent-free impression composition having a density within a range of from 1 to 1.5 g/ml., consisting essentially of:
   a) from 50 to 65% by weight of at least one 1H,1H,2H,2H-perfluoroalkyl acrylate having a chain length of the alkyl residue of from 6 to 12 carbon atoms;
   b) from 24.9 to 45% by weight of at least one non-fluorinated acrylate; and
   c) from 0.1 to 5% by weight of at least one photoinitiator.

2. The impression composition according to claim 1, characterized in that said perfluorinated acrylate is linear, branched and/or cyclic, and in which the carbon atoms adjacent to the acrylate function are not fluorinated.

3. The impression composition according to claim 1, characterized in that said perfluorinated acrylate is contained in an amount of from 55 to 65% by weight.

4. The impression composition according to claim 1, characterized in that said non-fluorinated acrylate is contained in an amount of at least 34.9% by weight.

5. The impression composition according to claim 1, characterized in that said photoinitiators are contained in an amount of from 1 to 2% by weight.

6. The impression composition according to claim 1, characterized by having a viscosity within a range of from 2 to 30 mPa·s.

7. The impression composition according to claim 1, characterized by consisting of a single, especially homogeneous, liquid phase.

8. A transparent molded part comprising a sheet-like substrate and, provided on a major surface of said substrate, a layer having a layer thickness within a range of from 3 to 300 μm and consisting of a polymerized impression composition having a density within a range of from 1 to 1.5 g/ml., containing:
   a) from 50 to 65% by weight of at least one perfluorinated acrylate;
   b) from 24.9 to 45% by weight of at least one non-fluorinated acrylate; and
   c) from 0.1 to 5% by weight of at least one photoinitiator;
   wherein the layer has a surface structure with diffractive surface elements having a maximum structure size of defects of such surface elements of up to 100 nm on the surface facing away from the substrate.

9. Essentially pressureless process for the preparation of a molded part according to claim 1, comprising the following steps:
   a) providing a negative casting mold with shapings of surface elements;
   b) introducing the impression composition, containing
      i) from 50 to 65% by weight of at least one perfluorinated acrylate;
      ii) from 24.9 to 45% by weight of at least one non-fluorinated acrylate; and
      iii) from 0.1 to 5% by weight of at least one photoinitiator;
      into the casting mold in an amount exceeding the shapings in the surface elements;
   c) applying a substrate to the exposed surface of the impression composition;
   d) polymerizing the impression composition to bond the layer of the impression composition to the substrate for preparing the molded part; and
   e) removing the finished molded part from the negative casting mold.

* * * * *